United States Patent [19]
Loftus

[11] Patent Number: 5,511,929
[45] Date of Patent: Apr. 30, 1996

[54] PORTABLE WINCH SYSTEM

[76] Inventor: Steven R. Loftus, 6070 Ansley Way, Swanee, Ga. 30174

[21] Appl. No.: 383,309

[22] Filed: Feb. 3, 1995

[51] Int. Cl.⁶ ..................................................... B60P 1/54
[52] U.S. Cl. .......................... 414/542; 414/538; 212/180
[58] Field of Search ....................... 414/496, 538, 414/541–543, 560; 212/180, 182; 254/279, 323, 362

[56] References Cited

U.S. PATENT DOCUMENTS

| | | | |
|---|---|---|---|
| 2,778,512 | 1/1957 | Strona | 414/542 |
| 3,048,371 | 8/1962 | Klimek, Jr. | 254/187 |
| 3,341,038 | 9/1967 | Wicklund | 414/542 |
| 3,613,918 | 10/1971 | Kruschke . | |
| 3,794,192 | 2/1974 | Monson . | |
| 3,888,368 | 6/1975 | Hawkins . | |
| 3,899,089 | 8/1975 | Wardlaw | 414/543 |
| 4,062,461 | 12/1977 | Vincent . | |
| 4,239,440 | 12/1980 | James | 414/542 |
| 4,265,585 | 5/1981 | Hawkins | 414/541 |
| 4,383,791 | 5/1983 | King | 414/542 |
| 4,700,851 | 10/1987 | Reeve et al. | 212/182 X |
| 5,028,198 | 7/1991 | Buhr | 414/542 |
| 5,119,961 | 6/1992 | Runn | 212/180 |

*Primary Examiner*—William E. Terrell
*Assistant Examiner*—James W. Keenak
*Attorney, Agent, or Firm*—Henry S. Jaudon; Cort Flint

[57] ABSTRACT

A portable winch system for use with truck bodies having a bed including raised opposed side walls. The system includes a winch comprising a drive motor, a transmission, a cable spool and a mounting bracket carried on a support bar for longitudinal movement. The support bar comprises first and second portions which are telescopically engaged to allow longitudinal adjustment thereof. The opposite ends of the support bar mount depending legs which are adapted to be removably engaged with the opposed side walls of the truck body to secure the winch system against rotational or longitudinal movement while allowing easy removal. With the support bar in position, the winch may be adjusted transversely of the truck bed.

14 Claims, 2 Drawing Sheets

PORTABLE WINCH SYSTEM

BACKGROUND OF THE INVENTION

The instant invention is directed to a portable winch system which is designed to be adapted to fit with a variety of sizes of vehicle load beds. The arrangement has multiple uses such as pulling heavy objects into the load bed, maintaining loaded objects in position. The system is designed to mount with variable size load beds and to be easily removed therefrom for storage or use with other vehicle beds.

Various winch systems have been designed for use with vehicles of various sizes. Usually these devices are designed for use with a boom assembly and are incorporated with permanently mounted assemblies and drive systems. U.S. Pat. Nos. 3,048,371; 3,613,918; 3,794,192; and 3,888,368 show examples of such types of systems. Another known arrangement involves incorporating a frame beyond the end of the bed and utilizing a winch system to lift the load vertically above the bed before bringing it over the bed and in loading position. U.S. Pat. Nos. 3,899,089; 4,239,440; 4,383,791; and 5,028,198 show such type devices. U.S. Pat. No. 4,062,461 is directed to a bale loader which incorporates chains wrapped about a hay bale. The chain is subsequently drawn by one end toward the bed which action rolls the hay bale onto the bed.

None of the referred to patents disclose the concept of removably mounting a winch with a vehicle bed nor structure which allows the winch adjustable positions widthwise of the bed. No reference teaches a winch system capable of mounting with vehicle beds of varying sizes. No reference teaches the concept of a powered winch system designed to draw cargo into the vehicle bed at selected positions across the width of the bed.

Accordingly, it is an object of this invention to provide a low cost and light weight winch system.

Another object of the invention is a winch system which mounts with vehicle beds of varying sizes.

Another object of the invention is a winch system which is easily removed from vehicle beds.

Another object of the invention is a winch system which may be easily stored.

Another object of the invention is to provide a portable winch system capable of adjustably supporting the winch in selected positions across the width and length of the bed.

SUMMARY OF THE INVENTION

The invention is directed to a portable winch system which is adapted to connect with a vehicle bed when in use, but is capable of being removed from the bed when not in use. The system includes a carrying frame adapted to be mounted on the top ends of opposed side walls of a vehicle bed. The carrying frame includes a support bar which extends transversely across the bed and above its floor. The support bar includes securing elements which attach it to the side walls.

A mounting bracket, which is secured with the winch, mounts the winch with the support bar in such a manner that the winch may be longitudinally adjusted along the support bar transversely of the bed.

The side walls include stake holes opening through the top ends thereof. The stake holes are arranged in pairs transversely of the bed. The securing elements comprise a depending leg secured with each end of the support bar. The depending legs are adapted to fit in respective of the opposed stake holes to secure the support shaft against rotation and longitudinal movement.

The system includes a stabilizing plate attached at right angles to each of the depending legs. The stabilizing plates extend parallel with the side walls and to rest on the top ends thereof when the carrying frame is secured with the bed. The support bar has a plurality of sides forming a cross section which is preferably one of square, rectangular or triangular.

In an alternative arrangement, the securing elements comprise a top bracket secured with the top side of each side wall in opposed relationship transverse of the bed. The top brackets include spaced vertical ears which are adapted to receive the opposite ends of the support bar. A locking pin secures the ends between the ears.

A locking plate is arranged beneath each top side to cooperate with the upper brackets to form securing elements firmly affixed with the top sides of the sidewalls.

The support bar may be elevated at least 12" above the top sides of the side walls. In this arrangement, the depending legs are lengthened and the stabilizing plates are secured with each of the depending legs intermediate their length. The stabilizing plates are again arranged perpendicularly of the depending legs to again rest on the top sides when depending legs are positioned in the stake holes of the side walls. A brace is normally provided between ends of the support bar and the unsecured ends of the stabilizing plates. The braces extend at approximately 45°.

The winch includes an electrical drive motor, a transmission, a cable spool, and a cord connecting the drive motor with the electrical system of the vehicle. The transmission is housed in a housing to which is attached a mounting bracket. The mounting bracket includes a mounting plate to which a shaped plate is secured to form a shaped opening therebetween. The support bar is received in the opening in a non-rotating but reciprocal manner. The support bar and the opening each comprise at least three parallel sides.

The support bar comprises a first section and a second section. The second section is shaped and sized to telescopically fit within the interior of the first section in a non-rotating manner whereby the length of the support bar may be adjusted.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
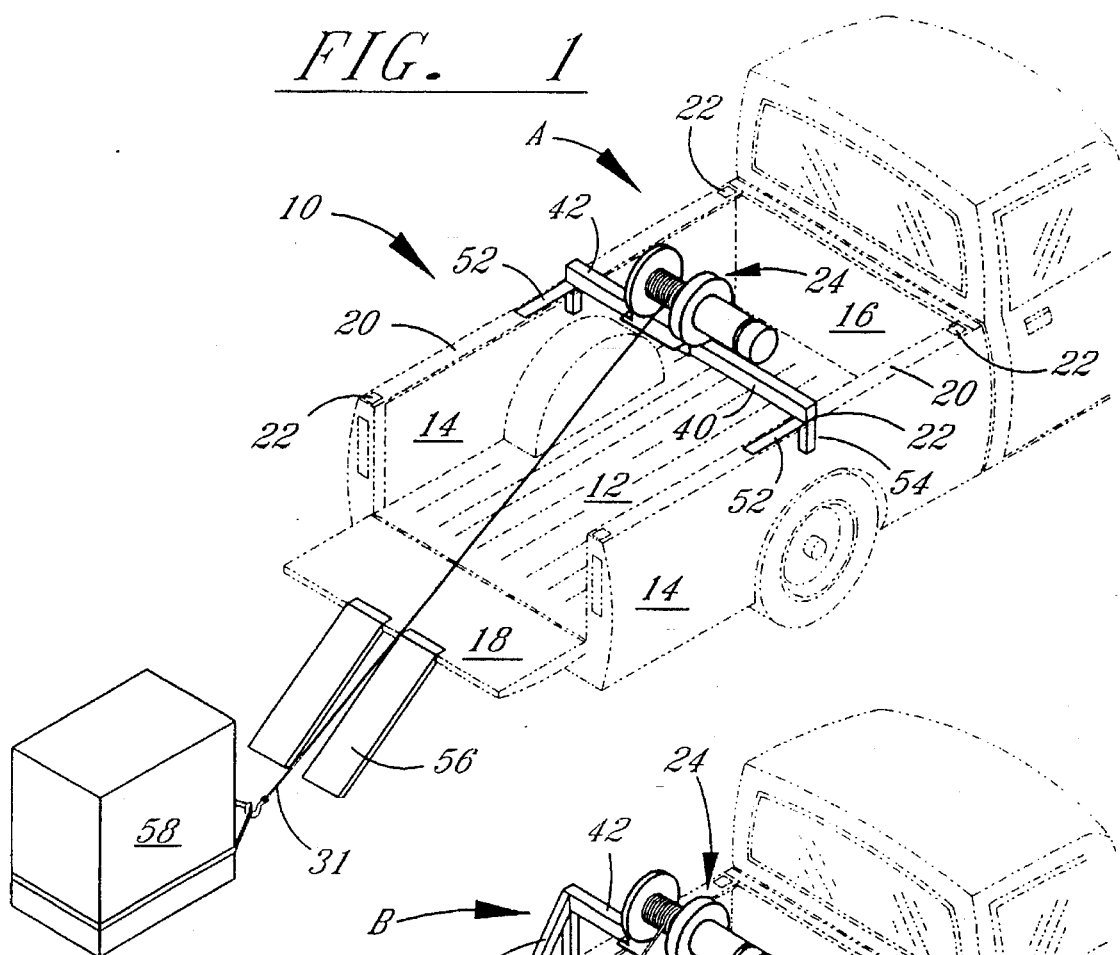
FIG. 1 is a perspective view of a first embodiment of the winch system of the invention mounted midway a vehicle bed.
Figure 3:
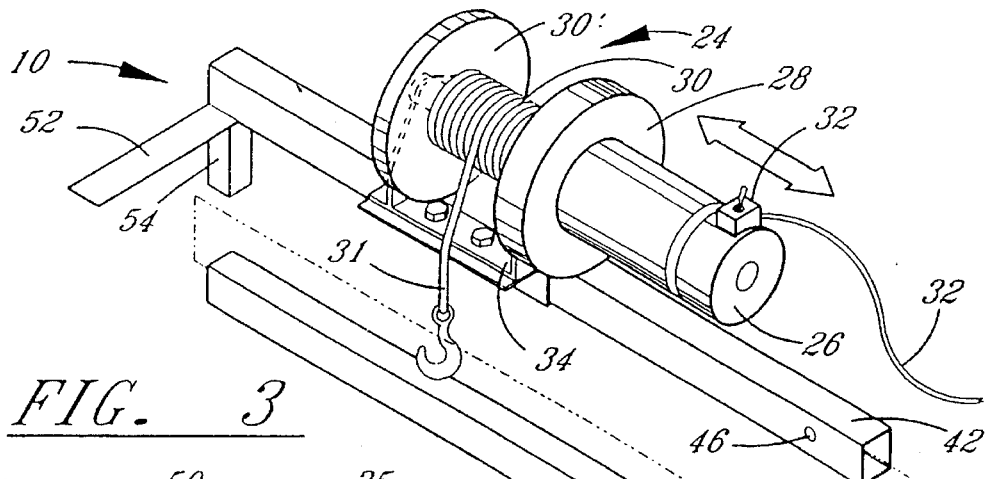
FIG. 3 is an exploded view of the first embodiment of the invention.
Figure 4:
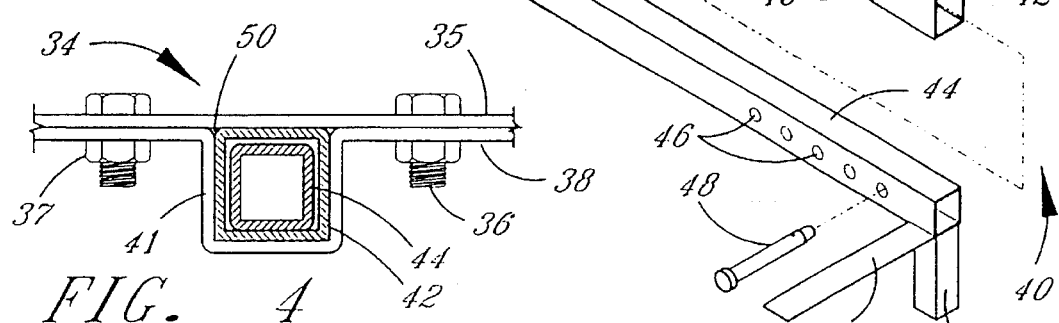
FIG. 4 is a sectional end view showing the interrelationship between the support bar elements and the winch mounting bracket.

Turning now to FIGS. 1, 3 and 4, a portable winch system A is shown operating with a standard bed 10 of a pick-up truck. Bed 10 includes floor 12, side walls 14, end 16 and gate 18. Side walls 14 include top side 20 which extends parallel with floor 12 and six stake holes 22 which are formed through top sides 20. Stake holes 22 are arranged in pairs transverse of bed 10 and are longitudinally spaced along top sides 20.

Portable winch system A includes winch 24 comprising a 12 volt motor 26, drive housing 28 and cable spool 30 mounting a cable 31. Motor 26 is electrically driven through lead 32 which connects via suitable circuitry with the battery of the vehicle. A control toggle switch 32 acts to control the motor between off, forward motion and reverse motion. This winch which has a 1350 pound stall capacity is commercially available and is sold under the name Super Winch. Winches of more or less capacity could be adapted to operate with the system of the invention.

Figure 5:
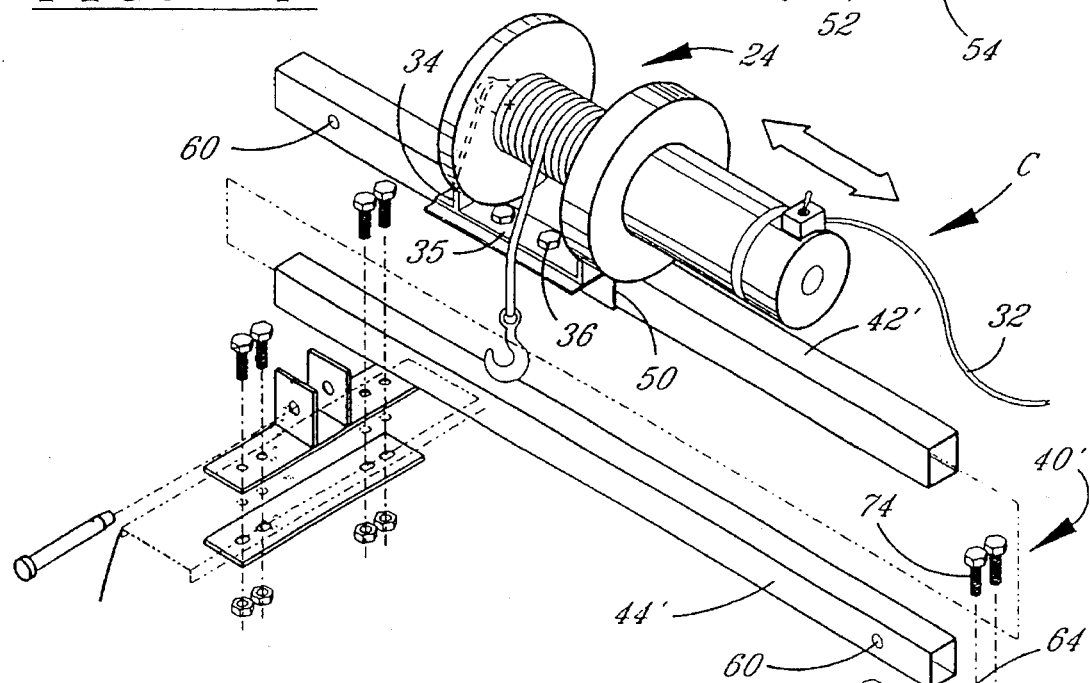
FIG. 5 is an exploded perspective view of a third embodiment of the invention.

Motor 26 is connected with a drive mechanism which consist of suitable gearing to generate the necessary stall capacity and is carried in housing 28. Spool 30 is mounted on an axle (in phantom) one end of which connects with the drive and the other end extends beyond wall 30'. Bracket 34 mounts with housing 28 and rotatably carries the free end of the spool axle. Bracket 34 includes a planar first plate 35. A second plate 38, which has a shaped central portion 41, is adapted to secure with first plate 35 of bracket 34 as shown in FIGS. 3–5 to form a substantially square opening 50. Second shaped plate 38 may be connected with bracket 34 with bolts 36 which pass through aligned holes in first plate 35 and are secured by nuts 37.

Portable system 10 includes a support bar 40 which is preferably hollow and shaped to have a square cross-section. Support bar 40 consist of a first element 42 and a second element 44 which fits into the interior of the first element. It is preferred that the outer walls of element 42 are 2" wide while the outer walls of element 44 are 1¾" wide.

Second element 44 telescopes inside of element 42 which allows for longitudinal adjustment of mounting bar 40. Elements 42 and 44 may be locked in position by passing pin 48 through mating holes 46.

Winch 24 is mounted with support bar 40 by passing the bar through shaped opening 50 formed on bracket 34 and plates 35 and 38. Opening 50 is of a size and shape to allow longitudinal movement of winch 24. The substantially square configurations of opening 50 and support bar 40 prevent rotational movement of winch 24.

The outside ends of support shaft 40 have depending legs 54 formed therewith. Legs 54, which are approximately 5" long, extend perpendicularly of the longitudinal axis of support bar 40 and are of substantially equal size as element 42, 44. A stabilizing plate 52 is attached to the opposite ends of support bar 40. Stabilizing plates 52 are arranged perpendicular to the longitudinal axis of support bar 42 and at right angles with depending legs 54.

In practice elements 42, 44 forming support bar 40 are adjusted longitudinally to position depending legs 54 in alignment with a selected pair of stake holes 22 of side walls 14. Depending legs 54 are inserted into stake holes 22 until support bar 40 and stabilizing plates 52 come to rest on top ends 20. Stabilizing plates 52 act to provide additional support against torque generated when the winch is in use. The support bar is held in stationary position atop ends 20 of bed 10 against longitudinal or transverse thrust by the interaction between legs 54 and stake holes 22. This mounting structure does not hold support bar 40 in position against vertical thrust allowing the portable winch system to be easily raised vertically and separated from bed 10.

With the portable winch system A engaged with bed 12, lead 32 is connected with the power source. Winch 24 is adjusted to a desired positioned width wise the bed and motor 26 is activated to play out cable 31. If desired a pair of ramps 56 may be engaged with the gate 18 as shown in FIG. 1. Cable 31 is connected with a cargo depicted at 58 in any suitable manner and switch 31 is activated to rotate spool 30 in the opposite direction to pull the cargo into the bed.

Because the location of winch 24 is adjustable transversely of bed 10, a plurality of cargo units may be drawn into side by side positions.

When not in use, portable winch system A may be removed from bed 10 and stored in a suitable place such as the cab of the truck. While store, the system is safe from theft and away from inclement weather.

It is noted that due to the telescoping action of elements 42, 44 the winch support system is easily adapted to fit onto truck beds of varying widths. Also, while the cargo shown is boxed, the system may load many varied items such as game, logs, hay rolls, and yard maintenance equipment.

Figure 2:
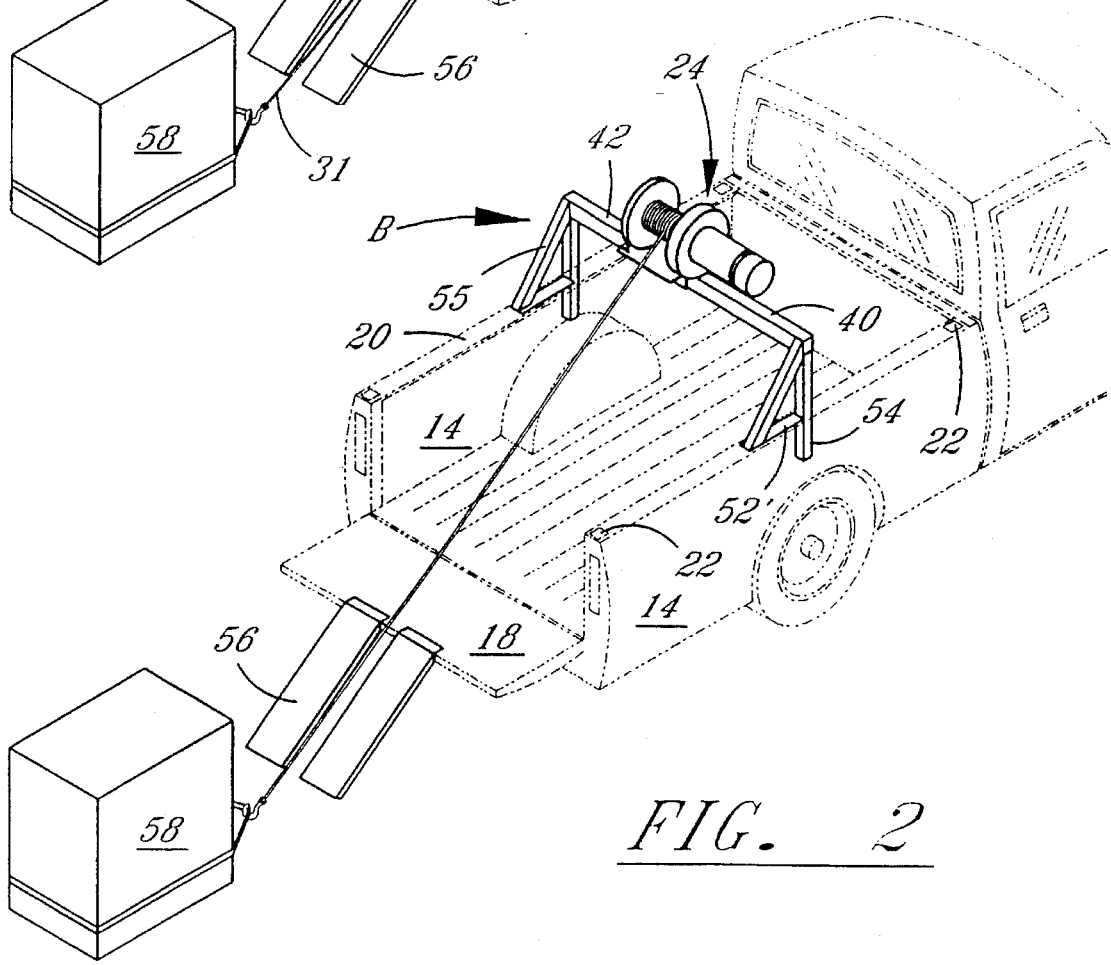
FIG. 2 is a perspective view similar to FIG. 1 showing a second embodiment of the invention.

Turning now to FIG. 2, a second embodiment of the portable winch system of the invention is shown at B. In this embodiment, it is desired that support bar 40 and winch 24 are elevated above top ends 20 of side frames 14. To accomplish this, depending legs 54' which are again secured with opposed ends of support bar 40 are lengthened an amount equal to the desired elevation of support bar 40, usually about 12". This brings the total length of depending legs 54' to about 17". Stabilizing plates 52' are secured with the rear side of depending legs 54' at about 5" from their free end. Plates 52' are arranged to extend perpendicularly of legs 54'. Braces 55 are secured with the free ends of stabilizing plates 52' and the opposed ends of support shaft 40 to provide additional resistance against torque for the portable winch system B. In the arrangement shown in FIG. 2, all elements identified with like numerals of elements shown in FIG. 1 are identical to those elements.

FIG. 5 shows a third embodiment of the invention. This arrangement is designed to provide a securing system which accommodates those vehicle beds which are not formed with stake holes 22. Again, winch 24 is adjustably supported on support shaft 40' by opening 50 formed between plate 35 of bracket 34 and shaped second plate 38. In embodiment C, opposed ends of support bar 40' have apertures 60 formed in their vertical sides. An upper plate 62 is formed with a pair of spaced vertical ears 64 arranged midway of its upper face. Ears 64 are spaced to receive the opposed ends of support bar 40'. In this position the portable winch system C is connected with the vehicle bed and held stationary against horizontal thrust longitudinally of the truck bed. The securing system of embodiment C does not secure support shaft 40' against vertical thrust allowing the winch assembly to easily be lifted vertically and re-positioned.

A locking arrangement is provided which includes apertures 66 formed in ears 64. Apertures 60 and 66 are arranged so that with the opposed ends of support bar 40' in position between ears 64, apertures 60 and 66 are aligned so that support bar 40' may be locked in position by locking pin 67.

Upper plate 62 is secured with top side 20' of the bed sidewall by placing a lower plate 68 below top side 20' and the upper plate. Apertures 70 are provided in plates 62, 68 and are aligned with apertures 72 in top side 20'. Bolts secure the plates with the side walls.

It is preferred for aesthetic purposes, that the support bar and associated legs and plates be formed of stainless steel, however, it has been found that rolled steel is equally functional. Optionally, any material, such as high strength plastics, capable of withstanding the stresses exerted against the support system, could be used.

Because of its inherent flexibility, which is created by the telescoping action of elements 42, 44 and the variable mounting systems shown in FIGS. 1, 2, and 5, winch support systems A, B, and C may be adapted to fit with A.T.V.'s (all terrain vehicles), riding lawn movers and boats as well as various sized truck beds.

While a preferred embodiment of the invention has been described using specific terms, such description is for illustrative purposes only, and it is to be understood that changes and variations may be made without departing from the spirit or scope of the following claims.

What is claimed is:

1. A portable winch system for use with a cargo bed having side walls, said system comprising:

a winch including a drive motor, a transmission, a cable spool and a mounting bracket having a multi-sided channel therethrough;

a multi-sided support bar passing through said multi-sided channel to mount said winch for selective movement longitudinally along said support bar;

said support bar comprising first and second portions telescopically engaged providing increased strength and allowing longitudinal adjustment of said support bar;

securing elements arranged adjacent opposed ends of said support bar, said securing elements being operative to engage said support bar such that it lies atop and perpendicularly of said sidewalls at selected longitudinal positions along said cargo bed;

said securing elements mounting said support bar on with said cargo bed in a fixed condition against horizontal thrust longitudinally of said cargo bed while mounting said support bar in a non-fixed removable condition against vertical thrust; whereby, said portable winch system may be stationarily mounted with said cargo bed when in use while being removably mounted for longitudinal adjustment along said cargo bed when not in use.

2. The portable winch system of claim 1 wherein said securing elements comprise opposed brackets secured with opposite sides of said cargo bed, said brackets having spaced vertical ears adapted to receive and support said opposed ends of said support bar adjacent said opposite sides.

3. The system of claim 2, wherein said securing elements include locking plates said locking plates being adapted to secure with said brackets and said cargo bed.

4. The portable winch system of claim 2 wherein said securing elements include locking pins and said opposed ends and said vertical ears have locking pin receiving openings formed therein; whereby said support bar may be fixed in position between said vertical ears by positioning said locking pins in said openings.

5. The portable winch system of claim 1 wherein said securing elements comprise depending legs carried by said opposed ends of said support bar and spaced receiving elements formed with said cargo bed, said receiving elements being adapted to freely receive said depending legs.

6. The system of claim 1 wherein said support bar includes locking means comprising a locking pin and openings formed in said first and second portions whereby said support bar may be locked at a selected length by positioning said locking pin in alignment with said openings.

7. A portable winch system in combination with a cargo bed comprising spaced side walls having stake holes arranged in spaced pairs longitudinally thereof, a floor spacing said side walls and first and second ends connecting with said floor and side walls, said winch system comprising;

a mounting bracket having a winch secured thereto, said mounting bracket defining a shaped channel;

a support bar passing through said shaped channel, said support bar carrying said mounting bracket and winch for longitudinal movement along said support bar;

said support bar having a first and second section, said second section being shaped and sized to telescopically fit within the interior of said first section in a non-rotating manner to provide said support bar with increased strength and adjustable length;

said support bar having spaced depending legs, said depending legs being adapted to engage with a selected pair of said spaced stake holes to secure said support bar atop said side walls against horizontal thrust while allowing vertical movement of said support bar against vertical thrust; whereby said winch system may be stationarily connected with said cargo bed during winching operation and may be disconnected from said cargo bed with vertical movement of said support bar and selectively reconnected with said bed in selected spaced longitudinal positions of said bed and said winch may be selectively positioned along said support bar transversely of said bed.

8. The system of claim 7 wherein said mounting bar includes a stabilizing plate arranged at right angles with each said depending leg, said stabilizing plates and a lower surface of said mounting bar extending along a common plane.

9. The system of claim 7 wherein said support bar includes a plurality of sides which form a cross section which is one of square, triangular and rectangular.

10. The system of claim 7 further including a stabilizing plate secured with an intermediate portion of each of said depending legs, said stabilizing plates acting to limit the penetration of said depending legs in said stake holes.

11. The system of claim 10 wherein said support bar is positioned at least 12" above said top sides.

12. The system of claim 7 wherein said winch includes an electrical drive motor, a transmission, a cable spool, and means connecting said drive motor with the electrical system of said vehicle.

13. The system of claim 7 wherein, said mounting bracket includes a lower first plate connected with a second plate having a shaped central portion, said first plate and said second plate together forming said shaped channel.

14. The system of claim 13 wherein said support bar and said shaped channel each comprise at least three parallel sides.

* * * * *